United States Patent
Marin et al.

(10) Patent No.: US 11,436,469 B2
(45) Date of Patent: Sep. 6, 2022

(54) KNOWLEDGE GRAPH FOR CONVERSATIONAL SEMANTIC SEARCH

(71) Applicant: Microsoft Technology Licensing, LLC, Redmond, WA (US)

(72) Inventors: Marius Alexandru Marin, Seattle, WA (US); Paul Anthony Crook, Bellevue, WA (US); Vipul Agarwal, Bellevue, WA (US); Imed Zitouni, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 764 days.

(21) Appl. No.: 15/664,124

(22) Filed: Jul. 31, 2017

(65) Prior Publication Data

US 2019/0034780 A1   Jan. 31, 2019

(51) Int. Cl.
*G06N 3/00* (2006.01)
*G06F 16/951* (2019.01)
*G06F 16/901* (2019.01)
*G06F 16/332* (2019.01)

(52) U.S. Cl.
CPC ......... *G06N 3/006* (2013.01); *G06F 16/3329* (2019.01); *G06F 16/9024* (2019.01); *G06F 16/951* (2019.01)

(58) Field of Classification Search
CPC ...... G06N 3/006; G06N 20/00; G06N 3/0445; G06N 7/005; G06F 16/3329; G06F 16/951; G06F 16/9024
See application file for complete search history.

(56) References Cited

U.S. PATENT DOCUMENTS

| | | |
|---|---|---|
| 9,189,742 B2 | 11/2015 | London |
| 9,466,297 B2 | 10/2016 | Crook et al. |
| 2004/0139107 A1* | 7/2004 | Bachman .............. G06F 16/951 |

(Continued)

OTHER PUBLICATIONS

"International Search Report and Written Opinion Issued in PCT Application No. PCT/US2018/034971", dated Aug. 9, 2018, 13 Pages.

(Continued)

*Primary Examiner* — Li B. Zhen
*Assistant Examiner* — Markus A. Vasquez
(74) *Attorney, Agent, or Firm* — Shook, Hardy & Bacon L.L.P.

(57) ABSTRACT

Described herein is a conversation engine that can be used in a system such as a personal digital assistant or search engine that combines a dynamic knowledge graph built during execution of a request and one or more static knowledge graphs holding long term knowledge. The conversation engine comprises a state tracker that holds the dynamic knowledge graph representing the current state of the conversation, a policy engine that selects entities in the dynamic knowledge graph and executes actions provided by those entities to move the state of the conversation toward completion, and a knowledge graph search engine to search the static knowledge graph(s). The conversation is completed by building the dynamic knowledge graph over multiple rounds and chaining together operations that build toward completion of the conversation. Completion of the conversation results in completion of a request by a user.

20 Claims, 8 Drawing Sheets

(56) References Cited

U.S. PATENT DOCUMENTS

| | | | |
|---|---|---|---|
| 2007/0203869 | A1 | 8/2007 | Ramsey et al. |
| 2013/0278492 | A1* | 10/2013 | Stolarz ................. G06F 3/14 345/156 |
| 2014/0201629 | A1 | 7/2014 | Heck |
| 2014/0280307 | A1 | 9/2014 | Gupta et al. |
| 2015/0293904 | A1* | 10/2015 | Roberts ............. G06F 40/169 704/9 |
| 2015/0332672 | A1 | 11/2015 | Akbacak et al. |
| 2015/0356136 | A1 | 12/2015 | Joshi |
| 2015/0370787 | A1 | 12/2015 | Akbacak et al. |
| 2016/0163311 | A1 | 6/2016 | Crook et al. |
| 2016/0171387 | A1 | 6/2016 | Suskind |
| 2018/0012231 | A1* | 1/2018 | Sapoznik ............. G06N 3/08 |
| 2018/0144053 | A1* | 5/2018 | Ankisettipalli ..... G06F 16/3329 |
| 2018/0189267 | A1* | 7/2018 | Takiel .............. G06F 40/205 |
| 2018/0218011 | A1* | 8/2018 | Taycher .......... G06Q 30/0269 |

OTHER PUBLICATIONS

Sullivan, Danny, "Google's Impressive "Conversational Search" Goes Live On Chrome", http://searchengineland.com/googles-impressive-conversational-search-goes-live-on-chrome-160445, Published on: May 22, 2013, 13 pages.

Li, et al., "Personal Knowledge Graph Population from User Utterances in Conversational Understanding", In Proceedings of IEEE Spoken Language Technology Workshop, Dec. 2014, pp. 224-229.

He, et al., "Learning Symmetric Collaborative Dialogue Agents with Dynamic Knowledge Graph Embeddings", In Journal of the Computing Research Repository, Apr. 24, 2017, 18 pages.

Pemberton, Tye, "MindMeld Launches Deep-Domain Conversational AI", http://www.speechtechmag.com/Articles/News/Speech-Technology-News-Features/MindMeld-Launches-Deep-Domain-Conversational-AI-114896.aspx, Published on: Nov. 18, 2016, 1 pages.

Ma, et al., "Knowledge Graph Inference for Spoken Dialog Systems", In Proceedings of IEEE International Conference an Speech and Signal Processing, Apr. 19, 2015, 5 pages.

U.S. Appl. No. 15/400,014, Crook, et al., "Using an Action-Augmented Dynamic Knowledge Graph for Dialog Management", filed Jan. 6, 2017, 47 pages.

U.S. Appl. No. 15/605,555, Agarwal, et al., "Task Identification and Tracking Using Shared Conversational Context", filed May 25, 2017, 37 pages.

Larsson, et al., "Information state and dialogue management in the TRINDI dialogue move engine toolkit", In Journal of Natural Language Engineering, vol. 6, Issue 3-4, Sep. 2000, pp. 1-17.

Bhargava, et al., "Easy Contextual Intent Prediction and Slot Detection", IEEE International Conference on acoustics, speech and signal processing, Oct. 2013. 5 pages.

"Office Action Issued in European Patent Application No. 18734674.7", dated Sep. 10, 2021, 7 Pages.

"Office Action Issued in Indian Patent Application No. 202047004760", dated May 18, 2022, 6 Pages.

* cited by examiner

KNOWLEDGE GRAPH FOR CONVERSATIONAL SEMANTIC SEARCH

FIELD

This application relates generally to digital assistants and search systems. More specifically, this application relates to implementing digital assistants and conversational search systems.

BACKGROUND

Search engines and digital assistants differ not only in how they work but also in what they do and each has been tailored to address specific user scenarios and needs.

Search engines are created to find and display a wide variety of information, often pulling the information from many different sources. To accomplish this, search engines receive queries, in the form of text phrases and/or keywords which are used to return relevant search results. However, search engines do not support executing tasks on behalf of the user.

Digital assistants, on the other hand, can execute tasks on behalf of a user, one of which can be to execute a search. However, search results are necessarily limited given the way digital assistants interface with users, oven voice only or via a device with a small display.

It is within this context that the present embodiments arise.

DETAILED DESCRIPTION

Figure 1:
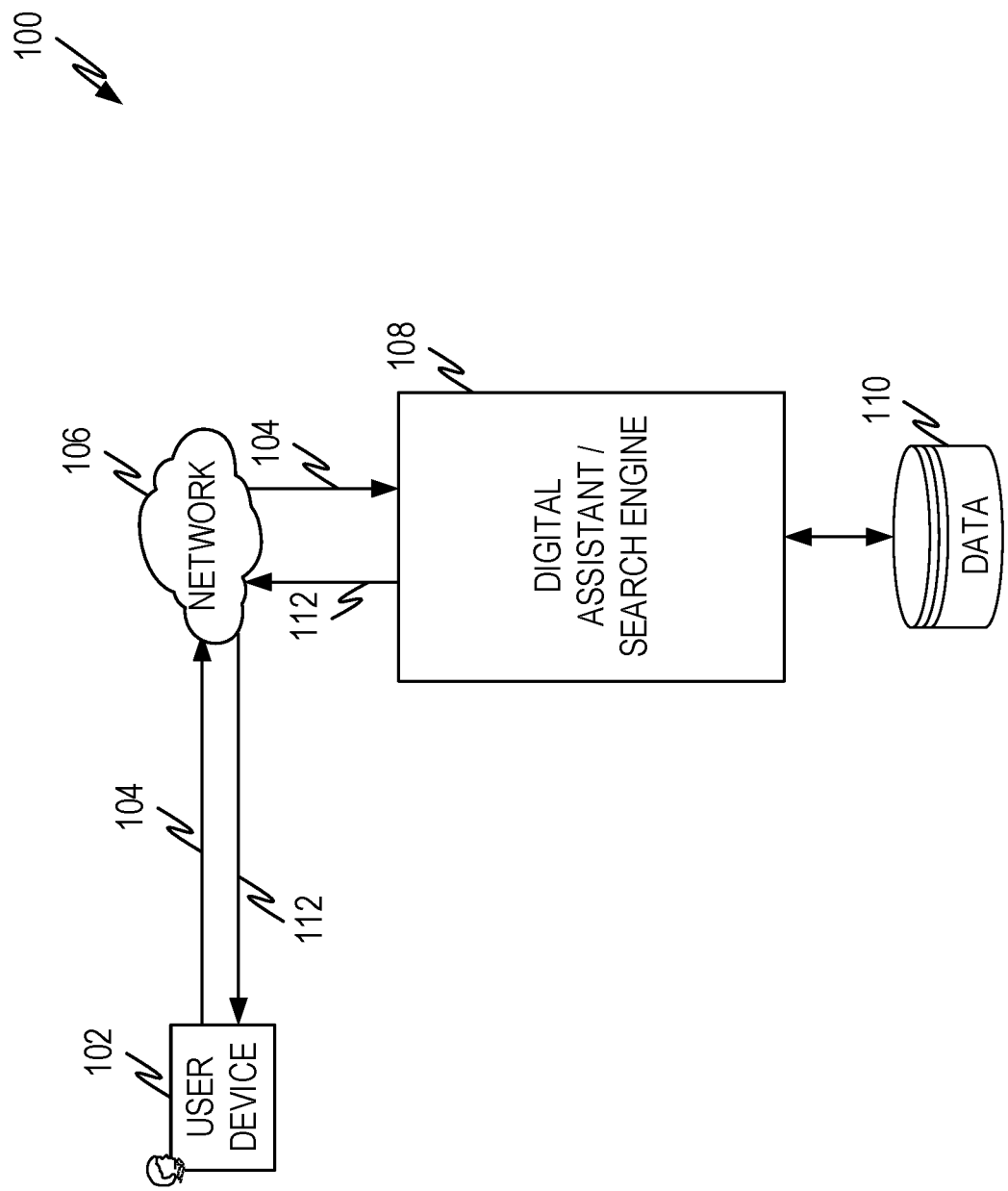
FIG. 1 illustrates an example of user interaction with a digital assistant and/or search engine.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Definitions

The following definitions are used in this disclosure:

Entities are objects stored in a knowledge graph such as in a dynamic or static knowledge graph or other data store as described herein. Entities include knowledge entities and recipes.

Knowledge entities are semantic representations of things that exist in the real world or that describe things about the real world, such as might be known to a search engine.

A recipe defines operations that relate to other entities, tasks to be accomplished by the system, and/or information available to the system. A recipe lists the input entity types that it consumes, the output entity types (if any) it produces and accomplishes its functionality through a procedure, typically written in a high-level or scripting language, an API call, and/or a call to another recipe. Recipes are also the mechanism by which the system is extended to accomplish new tasks.

A task is something that the user wishes to accomplish like "order food," "get me a ride to the airport," "what raptors exist in this area," and so forth.

A dialog is an interaction with a user or users that could happen in a non-natural language form (e.g., through displaying cards/tiles, activating UI buttons, making gestures, and so forth) as well as through a natural language form. A dialog is represented in a knowledge graph by a grouping of recipes and/or knowledge entities. Multiple dialogs can exist simultaneously in a knowledge graph and can go into and out of scope. For example, two potential dialogs may be carried out at the same time, one ordering food from a first vendor and another ordering food from a second vendor. At some point in the conversation, the system will terminate one of the dialogs and preserve the dialog that is most likely to yield an order.

A conversation is a series of multiple dialog exchanges with a user.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

Search engines and digital assistants perform different functions. Search engines are tailored to retrieve and display information relevant to a user search query, often pulling the information from a wide variety of sources. However, search engines cannot execute tasks on behalf of a user (other than retrieve search results). Digital assistants, on the other hand, are tailored to executing tasks on behalf of a user, one of which can be to execute a search. However, as noted above the search results returned to the user are necessarily limited due to the mechanism by which a user interfaces with a digital assistant, often voice only or via a small screen device. Thus, no single system can address user expectations, in particular for complex, natural language queries where no single task (for an assistant) and no single web search result (for search engines) is sufficient to address the user's needs. The embodiments disclosed herein present a solution for that problem.

Embodiments of the present disclosure include a conversation engine that can be used as part of a system, such as a personal digital assistant and/or search engine, to implement conversational semantics to retrieve information and/or accomplish tasks. The conversation engine combines different types of knowledge graphs to allow the flexibility of a digital assistant with the deep knowledge of a search engine.

A user submits a query to the system to start a new conversation (also referred to as a session) such as via speech, text, gesture, touch, visual/graphical or combinations thereof. For example, the user may say "set an alarm for 30 minutes before sunrise." A semantic representation of the input is created by a language understanding model. The semantic representation can comprise, for example intent(s) and one more slots. In the above example, the intent is to set an alarm and slots include "30 minutes" (duration), "before" (relation) and "sunrise" (event). This input kicks off a conversation with the system that can comprise one or more exchanges between the user and the system.

A state tracker is responsible for integrating new input into an existing representation of the conversation. In some embodiments, the representation of the conversation is held in a dynamic knowledge graph that is built up from an initial state and that is updated as new information is developed. When a new conversation is started, the dynamic knowledge graph comprises a semantic representation of the input query and contextual information specific to that user is used to seed the new session. Additionally, the initial dynamic knowledge graph can comprise one or more "recipes," which are defined above. In some embodiments, the initial dynamic knowledge graph comprises a recipe that searches a search knowledge graph (i.e., a search knowledge graph recipe). The search knowledge graph holds other recipes and longer-term information such as would be available in a search engine. The dynamic knowledge graph contents thus represent the conversation state at any given point in time during the processing.

A policy engine makes determinations as to what actions should be taken next with respect to the dynamic knowledge graph. In some embodiments, in its initial state, the dynamic knowledge graph comprises the semantic representation of the user query and the recipe to search the search knowledge graph. In some embodiments, initially, the policy engine can select the search knowledge graph recipe and use its action (i.e., search) to send the semantic representation of the user query to a knowledge graph search engine. The knowledge graph search process will return a subgraph of entities. Returned entities can include recipes, knowledge entities that contain information such as facts, and/or structural relationships between entities. The results (returned entities) are sent to the state tracker. The state tracker then integrates the search results into the dynamic knowledge graph.

The updated dynamic knowledge graph is evaluated by the policy engine, which selects one or more actions to take based on the recipes and other entities that are in the current dynamic knowledge graph. Actions can include, for example, execution of a procedure associated with a recipe until either further execution is not possible (e.g., due to some missing information required for execution), a call to an application program interface (API), a call to a renderer (a user-facing action such as requesting further information), further search of the search knowledge graph, and so forth.

To ask the user for more information, an existing renderer would be invoked to convert the selected actions into an object that can be displayed on the user's device or output surface (e.g. desktop or phone screen, audio-only speaker, webpage). If a further step in the conversation is initiated by asking the user for more information, the policy engine will have decided on the interface and approach to request information from the user. The user response is then transformed again into an object. The dynamic knowledge graph is updated by the state tracker, and the policy engine again selects action(s) to further the intent of the user.

A dialog is a grouping of multiple recipes and entities that represent an interaction with a user. Multiple dialogs with the user may be in process, which would be represented by multiple groups of recipes and entities stored in the session. Dialogs may be paused, either explicitly due to a user request, or implicitly if the user shifts focus to a different topic or unrelated request in the middle of a conversation. These dialogs may be resumed in the future. The current session thus contains sufficient information to reflect both the state of each recipe whose procedure is currently being executed, and dialogs or conversations put on hold by the system or by the user. If a new query from the user closely matches one of the paused dialogs, this dialog will restart and try to reach completion without the need to start from the beginning.

The dynamic knowledge graph will be also updated with respect to entities that are no longer in scope and/or recipes that have little likelihood of completion. This can involve pruning such entities and/or recipes from the dynamic knowledge graph. Pruning can be accomplished by removing entities/recipes from the dynamic knowledge graph, removing the relationship between such entities and/or recipes and other entities and/or lowering or negating weights associated with such entities, recipes and/or their relationships to other entities. Pruned entities/recipes can be archived in a user's personal knowledge graph so they can be reused in the future (e.g., because a user makes the same/similar request).

The system will iterate through multiple rounds until the intent from the user is achieved. When the intent from the user is achieved, the system can initiate a final action to inform the user of the results, confirm the action has been accomplished, provide an error that the action could not be accomplished, and so forth.

Description

FIG. 1 illustrates an example 100 of user interaction with a digital assistant and/or search engine. A user often accesses a digital assistant and/or search engine 108 via a user device 102 connected to the digital assistant/search engine 108 via a network 106. Requests and/or queries (collectively referred to herein as queries) 104 are sent to the digital assistant/search engine 108. Digital assistant/search engine 108 collects data 110 and responses 112 are sent back to the user device 102.

As user's expectations grow, no single digital assistant and/or search engine can fulfill the user's desires and expectations. For example, a user can initiate a conversation, such as through a user device (e.g., smart phone, wearable, tablet, computer). The following represents a sample exchange in which a user sends a mix of information requests and action requests to the system:

1. User: "show me the trailer for avatar"
2. System: "do you mean the movie directed by James Cameron?"

3. User: "yes"
4. System: retrieves and plays the trailer for avatar
5. User: "what other shows has he directed?"
6. System: retrieves and displays a list of other movies directed by James Cameron
7. User: "order me a copy of true lies"
8. System: initiates a dialog for the purchase of the movie "True Lies"

In this conversation, the user had information requests (i.e., a list of shows directed by James Cameron) and action requests that the user wanted the system to perform that were not simply retrieving information (i.e., play the trailer for the movie Avatar, ordering a copy of the movie True Lies). The conversation engine as disclosed in the embodiments below can handle the entire conversation with a user.

Figure 2:
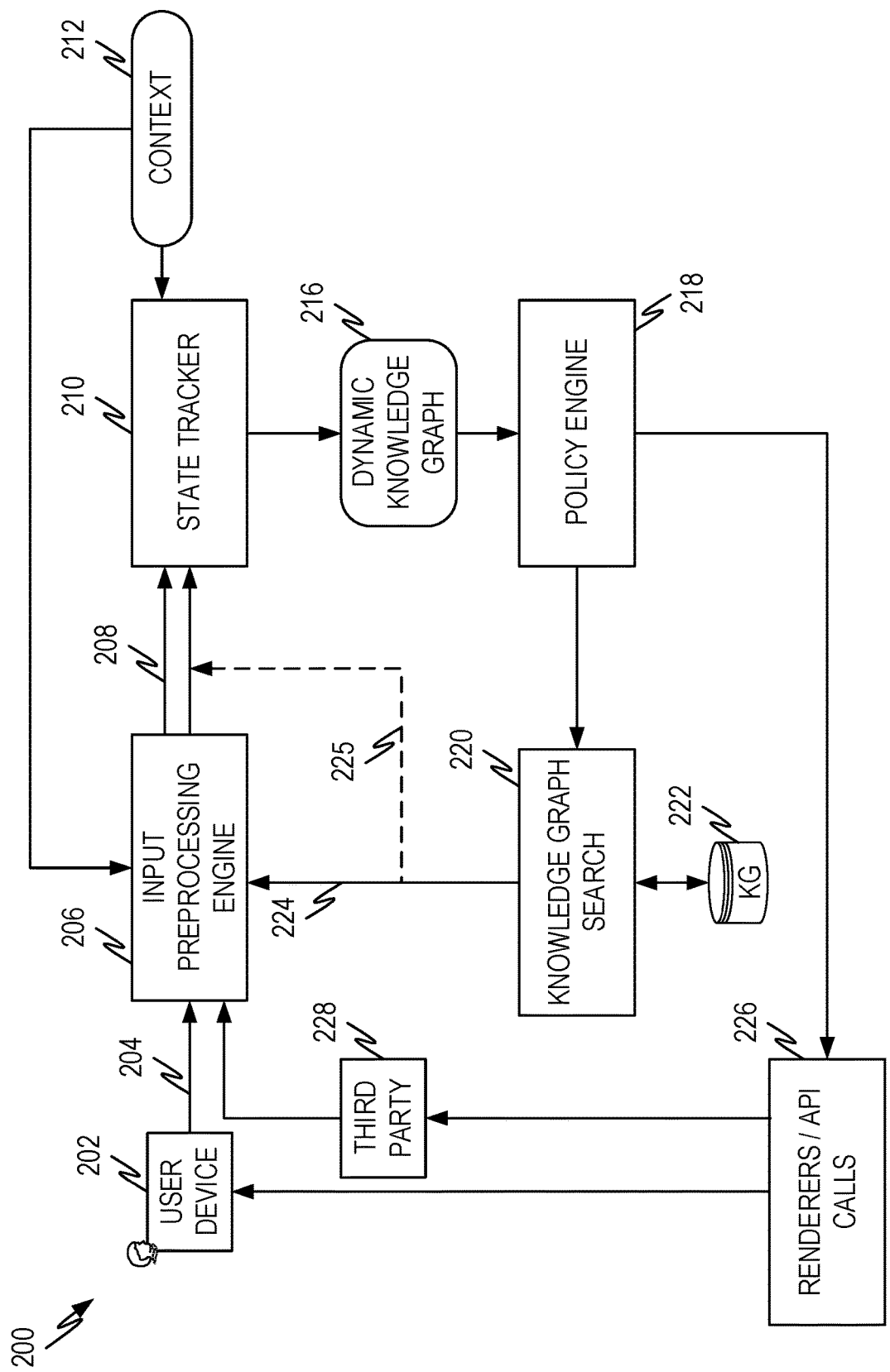
FIG. 2 illustrates an example architecture for a system according to some aspects of the present disclosure.

FIG. 2 illustrates an example architecture 200 for a system according to some aspects of the present disclosure. A user submits input 204 (e.g., query, request) via a user device 202. Example user devices include, but are not limited to, a mobile telephone, a smart phone, a tablet, a wearable, a smart watch, a personal computer, a desktop computer, a gaming device, a television, or any other device such as a vehicle, home appliance or the like that may use or be adapted to use a personal digital assistant, search service, or other system where the conversation engine can be incorporated.

In some implementations, the system can be provided as part of the user device 202, while in other implementations, the system can be accessed over a network. In still other implementations, the system can be implemented with some functionality residing on the user device 202 and other functionality being accessed over a network.

The architecture 200 comprises input preprocessing engine 206. Input preprocessing engine 206 is responsible for any preprocessing of inputs that come into the system. For example, the input preprocessing engine 206 is responsible for tasks such as:
  converting input received into a semantic output (described below);
  performing any format conversion or other conversions on the input;
  conditioning conversions and/or semantic output generation on contextual information (described below).

During operation, asynchronous input can come from any number of sources into the input preprocessing engine 206. The asynchronous input can include, for example, user input, proactive service triggers, device events, an API return event, polling responses (e.g., service call back events), and so forth. Proactive service triggers are a prearranged event that occurs and which will trigger some behavior on the part of the system and can come from either a user device or from another system. For example, if the system is monitoring a user's GPS and can ascertain the user is having trouble locating a destination, the system can use the combination of signals to trigger an offer to provide the user with directions to the destination. Device events include anything that happens on a device such as an alarm ringing, a timer expired, a web page refresh call back, and so forth. An API return event is the return event from synchronous or asynchronous API call.

The input 204 submitted by the user can take a variety of forms. For example, the input may come in the form of text, voice, touch, gesture, visual input, and/or combinations thereof. When input 204 is received by the system, the system creates a semantic representation 208 of the input 204. This is accomplished, for example, by a language understanding model in input preprocessing engine 206.

Any number of well known language understanding models and/or architectures can be used to extract semantic meaning from an input 204. In a representative embodiment, the semantic representation comprises intent(s) and slots. As used herein, "intent" is the goal of the user. For example, the intent is a determination as to what the user wants from a particular input. The intent may also instruct the system how to act. A "slot" represents actionable content that exists within the input. Using the first communication from the user in the above example, the user input is "show me the trailer for avatar." In this communication the intent of the user can be expressed as "get a video clip" or, perhaps, "watch a video clip." The slots would include "avatar" which describes the content name and "trailer" which describes the content type. If the input was "order me a pizza," the intent is to order/purchase something and the slots would include pizza, which is what the user desires to order.

The semantic representation of the input 208 is passed to the state tracker 210. The state tracker 210 is responsible for various functions including:
  creating a new representation for a new conversation;
  maintaining the state of the current conversation;
  integrating new input and entities into an existing representation of the conversation to update the current conversation;
  represent uncertainty (e.g., confidence scores) for tasks and entities in the current representation of the conversation; and
  other functions.

In some embodiments, the conversation is represented in a dynamic knowledge graph that has an initial state for a new conversation and grows as additional entities are added over multiple turns or rounds as described herein. As used in this disclosure, an "entity" is an object stored in the dynamic knowledge graph and can include recipes and knowledge entities (e.g., that represent objects, information, and/or knowledge of the real world). Entities can be strongly typed, which means having a fixed semantic representation as defined in at least one static knowledge graph (discussed further below). Examples of knowledge entities can be an entity representing a particular business, an entity representing a particular item sold by the business, an entity representing the parent company of the business, an entity representing a particular date or time, an entity representing an alarm to be set, and so forth. Entities may be static in the sense that they are pre-calculated or pre-determined or may be dynamic in the sense that they are generated on the fly.

As used herein "recipe" means a type of entity that define operations that relate to other entities or tasks to be accomplished by the system or information available to the system. A recipe lists the input entity types that it consumes, the output entity types (if any) it produces and has an associated procedure, typically written in a high-level or scripting language and/or an API call that the recipe uses to accomplish its functionality. Recipes are also the mechanism by which the system is extended to accomplish new tasks. Representative examples of recipes include a recipe to order ground transportation (e.g., a taxi or an Uber®), a recipe to add an item to a user's calendar, a recipe to adjust a setting on a device, a recipe that knows how to book an airline flight, a recipe to adjust the lighting in a room, or a recipe to perform any other type of task.

When a new conversation is started by a user by submitting user input 204, the semantic representation of the input 208 is presented to the state tracker 210, which uses the input 208, contextual information specific to that user 212, and other entities to seed the new conversation. A conversation comprises a series of exchanges with a user and is also referred to as a session.

To seed the new conversation, the state tracker 210 starts with an empty dynamic knowledge graph and updates it to hold the semantic representation of the input 208, contextual information 212 and other information. Contextual information can comprise one or more of:

signals from the user device 202 such as geolocation, device type, sensor readings, and so forth;
inferred signals such as from an inference engine that infers where a user might be, what a user is doing, and so forth;
information from a user's personal knowledge graph and/or personal data platform; and/or
other environmental and/or contextual information.

Additionally, the initial dynamic knowledge graph can comprise one or more recipes. Initially, the dynamic knowledge graph can be seeded with a recipe that knows how to search a static knowledge graph (discussed below) and/or a recipe that knows how to search a user's personal knowledge graph. Other initial recipes may also be used to seed the initial state of the dynamic knowledge graph. Collectively, the semantic input, the context and the initial recipes are stored in the dynamic knowledge graph and represent the initial state of the dynamic knowledge graph. The dynamic knowledge graph 216 is updated over several rounds (discussed below) and on each round the state tracker 210 integrates newly developed entities into the dynamic knowledge graph 216 to update its state. Thus, the dynamic knowledge graph evolves over time as the conversation evolves and develops and represents the current state of the conversation at any given time.

The dynamic knowledge graph 216 can be implemented by a Resource Description Framework (RDF) triple (RDF-triple) knowledge graph which is a purpose-built database to store and retrieve triples through semantic queries. A triple is a data entity that is composed of subject-predicate-object, like "Bob-is-35" or "falcons-are a type of-raptor." Other types of implementations can also be used.

In this disclosure, a grouping of entities in the dynamic knowledge graph that are related or interlinked will be referred to as a dialog. The dynamic knowledge graph can contain multiple dialogs and entities (either related to a dialog or unbound to any dialog). The state tracker 210 also prunes entities and/or dialogs out of the dynamic knowledge graph when they have gone out of scope and/or are unlikely to be completed. For example, if the dynamic knowledge graph includes two recipes one that will order a pizza and another that will order sandwiches and it becomes clear that the user is intending to order pizza instead of sandwiches, the recipe that orders sandwiches will have gone out of scope and can be pruned out of the dynamic knowledge graph. Pruning can also be based on likelihood of completion, confidence scores or a similar metric. As discussed below, the state tracker 210 can keep track of confidence scores across different dialogs and entities. The confidence scores can help identify when a dialog should be pruned from the dynamic knowledge graph.

When a dialog or entity is pruned from the dynamic knowledge graph it can be deleted or archived for later retrieval. For example, if the sandwich recipe goes out of scope, it can be archived in a location, such as the user's personal knowledge graph, where it can be retrieved and reactivated if desired at a later time. The pruning and/or archiving can take place on a periodic and/or aperiodic basis, in response to an event, and/or so forth.

The dynamic knowledge graph can also contain paused dialogs (including paused recipes). At any given time, one or more dialogs can be paused for a variety of reasons, such as the needed input is not (yet) available, the dialog is waiting on the completion of a recipe, API call, and so forth. As described below, the system can switch between dialogs and pause dialogs as the system moves toward the goal completing the user's request.

The dynamic knowledge graph 216 is presented to the policy engine 218. The policy engine is responsible for one or more operations comprising:

selecting one or more entities (including knowledge entities and recipes) from the dynamic knowledge graph;
associating selected entities with selected recipes or knowledge entities;
executing one or more of the selected recipes, using the associated knowledge entities as input to the recipes;
selecting one or more acts to be accomplished, as proposed by the recipes; and
other functions In other words, the policy engine 218 evaluates the dynamic knowledge graph 216 and determines what actions should be taken next with respect to the dynamic knowledge graph to advance the state of the conversation toward accomplishing the user's intent. Thus, the policy engine 218 takes as an input the current dynamic knowledge graphs and outputs one or more acts to be taken. The policy engine 218 can select multiple acts each time it is called. As explained below, the acts can be to execute a recipe, call an API, call a renderer, call a device, and so forth. The calls can be "user facing" in the sense that they can present a dialog box/request to the user to present information and/or request information or the calls can be "internal" in the sense that they are calls that do not involve interaction from the user.

When a call is user facing, two interacting factors include the high-level form of the presentation and the dialog flow. Presentation of multiple pieces of information can shorten the dialog flow, whereas presentation of information one piece at a time will stretch out the dialog. The policy engine 218 will make the selection based on whether the user can understand what is being asked, which in turn depends on the canvas and (in some instances) the user context. As used herein, a "canvas" is the appearance of the conversation agent to the user. A canvas is defined by both the device (e.g., form factor, presence/absence of a screen, screen size, presence/absence of a keyboard or other user input device/method, and so forth) and the context of the conversational agent (e.g., can the agent launch a browser, is the agent embedded in a chat window, and so forth). These factors can be placed into a matrix or other look-up table where the system can choose an appropriate call and/or call parameters based on the canvas or the user context or both. For example, if the system needs to retrieve a preference for the type of pizza the user wants to order and the size of the pizza the user wants to order, if the screen real estate is sufficiently large, and if the user can focus on the questions being asked, the system may elect to present a dialog asking for both pieces of information. On the other hand, if the user is in a vehicle interacting by voice, in order not to distract the user (i.e., add to the user's cognitive load), the system may elect to ask the questions one at a time.

Not all acts are user facing. For example, a selected act may comprise an API call. Such calls can be directed to internal or external services or back to the user's device to obtain information that was not passed with the initial user input. For example, consider a recipe that needs to know whether the user's device was playing a song when the input was given and if so, the title of the song. Such information may be expected to be supplied as part of the context identified when the user input is sent to the device as described above. However, if it was not part of the context, the system may make an API call to the device to request the information from the user device. In this case, such information can be supplied without requiring interaction on the part of the user. As another example, a recipe may need to know personally identifiable information (PII) that can only be requested on a need to know basis. For example, PII can include phone numbers of local address book contacts and would be requested from the user's device only when needed, such as by a conversational service to improve privacy. When the recipe needs the information to execute, an API call can be made to retrieve the PII based on the need to know. Again, such a call may not need the attention of the user if preauthorization has been granted for the situation.

As the response time of API or other calls can be variable, they can be dispatched as asynchronous processes which will report back via the preprocessing engine 206 when complete as described above, which can initiate the next round of processing. The policy engine 218 can also set call-backs which allow it to wait and see if an API responds and thus keep the user informed of progress or failures.

API or other calls often result in entities that are added to the state. Such entities may be grounded in semantic ontologies outside of the static knowledge graph (discussed below) of the system or some other ontology used by the system. In such a situation, adaptors can be used to map the semantic ontology of the received entity to the semantic ontology used by the system (e.g., in the static knowledge graph). Where a mapping cannot be reliably made, the returned entities can reside in a separate ontology space within the dynamic knowledge graph. This will result in them being kept separate (i.e., not mapped into existing dialogs) until a reliable mapping can be made, if ever.

One option for the policy engine 218 is to emit a single "Do Nothing" action. This can be used when the system is waiting on the next user input or waiting on other input from a different source that must be received before execution can be resumed.

One option for the policy engine 218 is to select the act associated with the recipe to search the static knowledge graph 222. As explained above, in its initial state, the dynamic knowledge graph comprises the semantic representation of the user query, contextual information, and a recipe to search the static knowledge graph. Thus, while the act of searching the static knowledge graph is always available, on the first pass, it is usually at least one of the options selected. The static knowledge graph contains a store of knowledge about the world, including knowledge entities and recipes, which are defined above. The search static knowledge graph action sends part of or the whole contents of the dynamic knowledge graph including the semantic representation of the user input and/or context to a knowledge graph search engine 220. The knowledge graph search engine 220 has an associated static knowledge graph 222 that stores entities including knowledge entities and recipes as described above. The semantic information in the user input and/or context is attached to the static knowledge graph 222 and a knowledge graph inference is run. Alternatively other well-known information retrieval approaches can also be used to retrieve entities, e.g., mapping whole or part of the dynamic knowledge graph (including the user query and context) to a vector and retrieving entities based on vector similarity with precomputed vector representations of the entities, and so forth. The result is a set of entities that include relevant recipes, knowledge entities, and/or structural relationships between entities.

In some embodiments, relevant information from the user's personal knowledge graph/personal data platform are included in the context and are thus also joined to the static knowledge graph 222. Thus, the inference can return relevant entities referenced by the user in previous archived dialogs that are not part of the static knowledge graph 222.

In this disclosure, a personal knowledge graph and a personal data platform can be used to store the same information, although in a different form. A personal knowledge graph stores information in the same or similar format as the other knowledge graphs referenced herein (e.g., static knowledge graph, dynamic knowledge graph). A personal data platform typically stores information in one or more tables and thus tends to retrieve information using table lookup. In this disclosure, the example of a personal knowledge graph will be used to store user information, although it should be evident to one of skill in the art that a personal data platform can also be used. Furthermore, personal knowledge graph and personal data platform are only representative examples of how such information can be stored.

The set of entities returned by the knowledge graph search engine 220 are independent of the flow that is applied for a canvas or device form factor. Thus, the entity does not care, for example, if information required to be collected is collected in one dialog with the user or multiple dialogs with the user.

The knowledge graph 222 is referred to herein as "static" to contrast it with the dynamic knowledge graph 216, which is modified by the various selected acts of the policy engine 218. Thus, static does not mean that knowledge graph 222 never changes. Rather it changes more slowly relative to the dynamic knowledge graph 216. The dynamic knowledge graph 216 grows and evolves as described herein as the system seeks to accomplish a user intent. The static knowledge graph 222 grows and evolves as new knowledge is added or new recipes are added, which is a slower process.

The static knowledge graph 222 changes in two important ways. First, the static knowledge graph 222 evolves and changes as additional knowledge is added to the graph, such as by web crawlers or other mechanisms that add knowledge to the static knowledge graph 222. Second, the static knowledge graph 222 changes as new recipes are added thereto. As explained above, adding new recipes to the system is a way to extend and change the functionality of the system.

Developers register recipes with the system or with a registration service. In one embodiment, two pieces of information are needed to register a recipe: 1) how to connect the recipe into the static knowledge graph 222 and 2) the procedure, recipe, and/or API that is called during execution of the recipe. To connect the recipe to the static knowledge graph 222, a declaration of the types of entities that the recipe consumes as input, including those that the recipe will try to collect, the types of entities that the recipe produces as output if any, and related entities. Related entities link the recipe to other entities or to semantically structured user input to make it discoverable. An example of entities that link the recipe to other entities or semantically structured input, consider a recipe for ordering pizza from Northwind Pizza. Such a recipe might link to the Northwind Pizza Company knowledge entity, but this knowledge entity is not needed as input to the recipe. All that is needed is a knowledge entity that represents a local Northwind Pizza shop. However, linking to the Northwind Pizza Company knowledge entity can help a query input by a user find the recipe in the static knowledge graph. Recipes can also be stateful in that they can compute values that are carried over from one execution to the next.

The declaration of related entities, input entities, output entities, and so forth establishes connections between the recipe and the static knowledge graph. Linking the recipe to related entities, along with the input and output definitions above, helps improve the likelihood that the recipe can be located in a relevant situation and helps improve the likelihood of successful execution. Over time, successful execution of recipes, failure of execution, and other feedback can be utilized to suppress less relevant recipes and elevate more relevant recipes. In one embodiment, machine learning techniques can be used to help identify relevant and less relevant recipes. Relevance is measured relative to how useful the recipe is to accomplishing the user intent.

The entities returned from the knowledge graph search engine 220 are sent to the state tracker 210 either through the input preprocessing engine 206 as represented by 224 or bypassing the input preprocessing engine 206 as represented by 225. The state tracker 210 will then incorporate at least a portion of the results into the dynamic knowledge graph 216 to update the state of the conversation as previously discussed and the updated dynamic knowledge graph 216 is sent to the policy engine 218 as part of the next round of processing.

Returning to the policy engine 218 for a moment, as previously described, assuming a sufficiently developed dynamic knowledge graph 216, the policy engine 218 can also select acts that do not involve the knowledge graph search engine 220 including calls to APIs and/or renderers. As noted above, API calls can be internal or external, client facing or non-client facing, to the client device 202 or to other devices 228. As noted above, these calls are typically asynchronous in some embodiments, but synchronous API/renderer calls can also be used. These API and/or renderer calls are indicated by 226. As illustrated in the diagram and discussed above, the results of the API and/or renderer calls can be received by the input preprocessing engine 206 and, once input preprocessing has finished, the entities are sent to the state tracker 210 for incorporation into the current dynamic knowledge graph 216. Detailed operation of the policy engine 218 is discussed below.

In summary, the dynamic knowledge graph is set to an initial state and the dynamic knowledge graph grows and evolves through several rounds of processing by adding, pausing, executing, and archiving entities within the graph. Multiple dialogs with the user may be in process at any given time, which would be represented by multiple groups of recipes and knowledge entities being stored in the session. The processing rounds continue until the intent of the user is accomplished or the processing ultimately fails and the user is informed that the task could not be completed.

Figure 3:
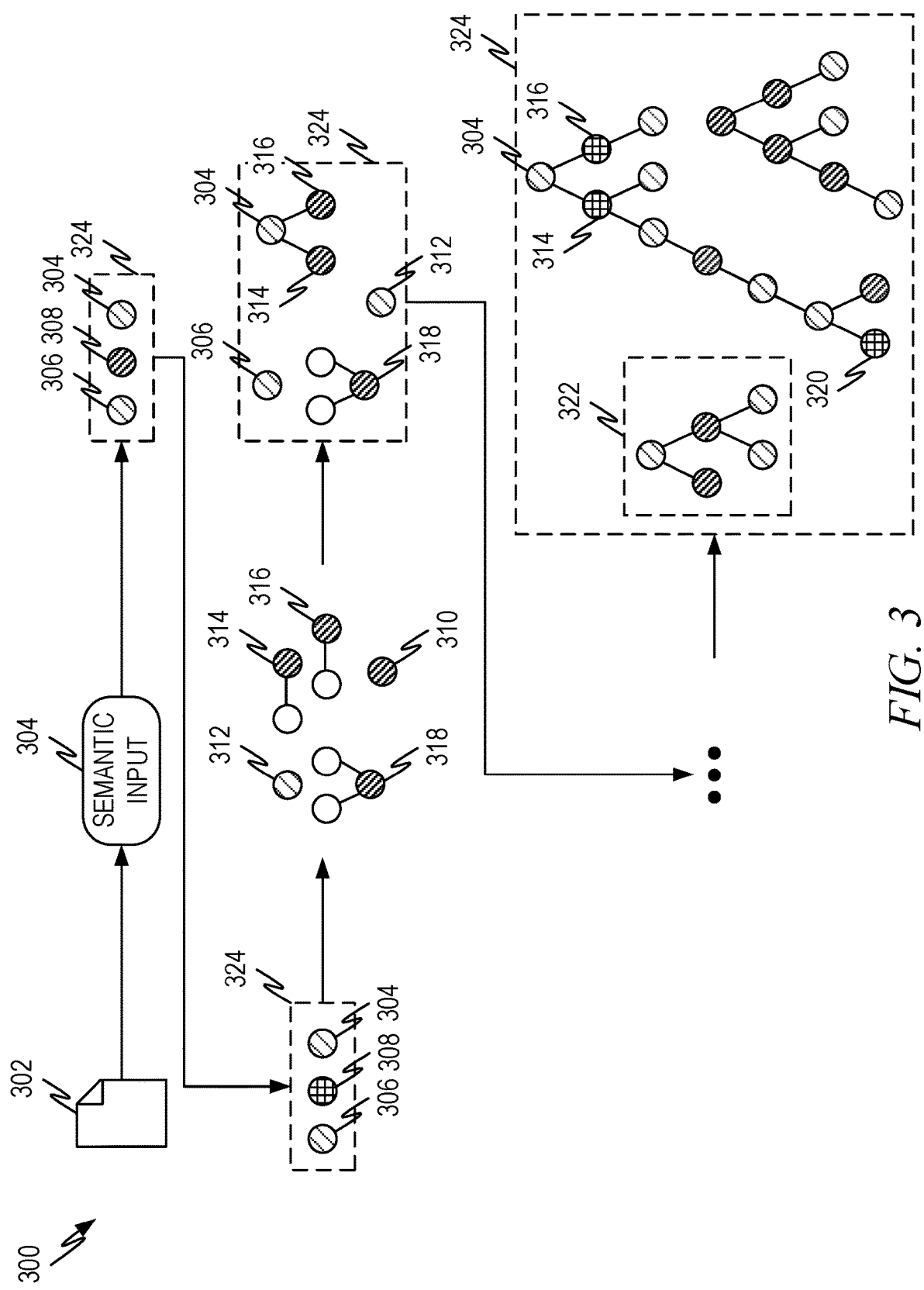
FIG. 3 illustrates an example of how a representative dynamic knowledge graph evolves during operation of a representative system.

FIG. 3 illustrates an example 300 of how a representative dynamic knowledge graph evolves during operation of a representative system. In this figure, the open circles represent unbound general entities (knowledge entities, etc.) such as where an input has not yet been bound, the wide diagonal filled circles represent knowledge entities or other information entities, and close diagonal filled circles and cross-hatch represent recipes. A general example with respect to FIG. 3 will be explained first and then a more specific example will be given to illustrate the process. A conversation is initiated with user input 302. The input preprocessing engine (206) creates a semantic representation 304 of the user input. The state tracker (210) starts with a blank dynamic knowledge graph 324 and seeds the dynamic knowledge graph 324 with the semantic input 304, the user context 306, and a recipe 308 that can search the static knowledge graph. Additionally, a recipe (not shown) can be added that can search a user's personal knowledge graph or personal data platform. This represents the initial state of the conversation.

The policy engine (218) evaluates the contents of the dynamic knowledge graph 324 and selects actions to take. In this initial round, there is only one recipe 308 that can be executed and so the policy engine activates/instantiates that recipe to execute. In the diagram, the recipe 308 searches the static knowledge graph (222) and outputs a collection of entities. In the example of FIG. 3, the output of the recipe 308 comprises one knowledge entity 312 and four recipes indicated as 310, 314, 316, and 318. The recipe 310 has no inputs that defined. The recipes 314 and 316 have one input each and the recipe 318 had two inputs defined.

This collection is passed to the state tracker (210) and the state tracker updates the dynamic knowledge graph to incorporate at least a portion of the collection. In this example, recipes 314 and 316 had inputs defined that matched user input 304. Thus, the user input 304 was bound to both the recipe 314 and the recipe 316 as illustrated. Context 306 remains in the graph and knowledge entity 312 and recipe 318 were added.

The policy engine evaluates the dynamic knowledge graph 324 and continues to select actions to execute in multiple rounds and the dynamic knowledge graph 324 continues to evolve. The last representation of the dynamic knowledge graph in FIG. 3 illustrates one dialog 322 that has been paused and another dialog that starts with recipe 314 and has evolved to include recipe 320. If recipe 320 is able to accomplish the intent associated with the user input 304, then the policy engine can select one or more actions, including an action from recipe 320 to effectuate the intent.

To place the above general example into more concrete terms, suppose a user speaks into a mobile phone and asks the system to "set an alarm for 20 minutes before sunrise." The system would receive that input and the input preprocessing engine would convert the voice to a common input format, such as text. The text would then be evaluated to create the semantic input representation that includes an intent "set an alarm" and slots "20 minutes before sunrise." In addition, the context of the request may include such information as the manner of input (voice), the device (mobile phone), the user's location (home), the time and date of the request, and other such contextual information.

The state tracker would take the semantic input representation, the context information and combine it with a search_KG (search the static knowledge graph) recipe and search_pKG (search the user's personal knowledge graph) recipe to form the initial state of the dynamic knowledge graph (dKG).

Upon evaluating the dKG, the policy engine selects the search_KG recipe to run. The policy engine outputs the selected action and the search_KG is executed with the semantic input and/or context as input. The output entity includes a knowledge entity that describes what sunrise is, a language understanding recipe, a chatbot recipe, a sunrise calculator that takes a latitude and longitude as input and outputs a time for sunrise, and a set alarm recipe that takes a time as an input and sets the alarm on the mobile device at the input time.

These are sent to the state tracker which does merging and binding of the entities. In this instance the state tracker binds the input string "set an alarm for 20 minutes before sunrise" to the language understanding recipe, which is responsible for returning the slots and intent(s) as indicated below. The remainder of the entities are merged into the dKG but are not bound to anything at this point.

The policy engine selects the language understanding recipe to execute and starts interpretation of the selected recipe. The output of the language understanding recipe outputs several possible interpretations of the input including:

1. Domain: Calendar, intent: GetEvent; slots: [event: sunrise]
2. Domain: Alarm; intent: SetAlarm; slots: [start_time: 20 min before sunrise]
3. Domain: Reminder; intent Create; slots [time_difference: 20 minutes, qualifier: before]

These different interpretations are passed to the state tracker and the state tracker integrates them into the dKG as three different outputs to the language understanding recipe. The policy again evaluates the updated knowledge graph and selects the search_KG recipe to run as the most likely to advance toward the user's requested task. The output of the search includes a calendar converter event entity that receives a language understanding slot event and outputs an event entity. The search also outputs a time qualifier that takes as an input an absolute time and a time difference and outputs a new absolute time and a recipe that searches the user's calendar. This recipe takes as an input a time and date and returns a list of events for the given time and date.

The output entities are sent to the state tracker, which integrates them into the dKG, binding the calendar event converter to the sunrise event of #1 above, the time qualifier to the slots of #2 and places the recipe for searching the user's calendar into the dKG unbound.

Subsequent rounds of processing bind a converted sunrise event to the sunrise calculator, identify the user's latitude and longitude based on the user's location, and calculate an absolute time for sunrise. This absolute time is then bound to the recipe that sets the alarm at a time that is 20 minutes before sunrise.

This slightly more detailed example illustrates how the state tracker binds entities to appropriate inputs, how subsequent searches of the static knowledge graph yield entities that can include recipes, converters, and so forth that are bound to appropriate inputs so that execution can advance. As described below, the policy engine can keep confidence scores for different possible actions and select those with the highest likelihood to move the dKG toward the ultimate intent specified in the user input.

Figure 4:
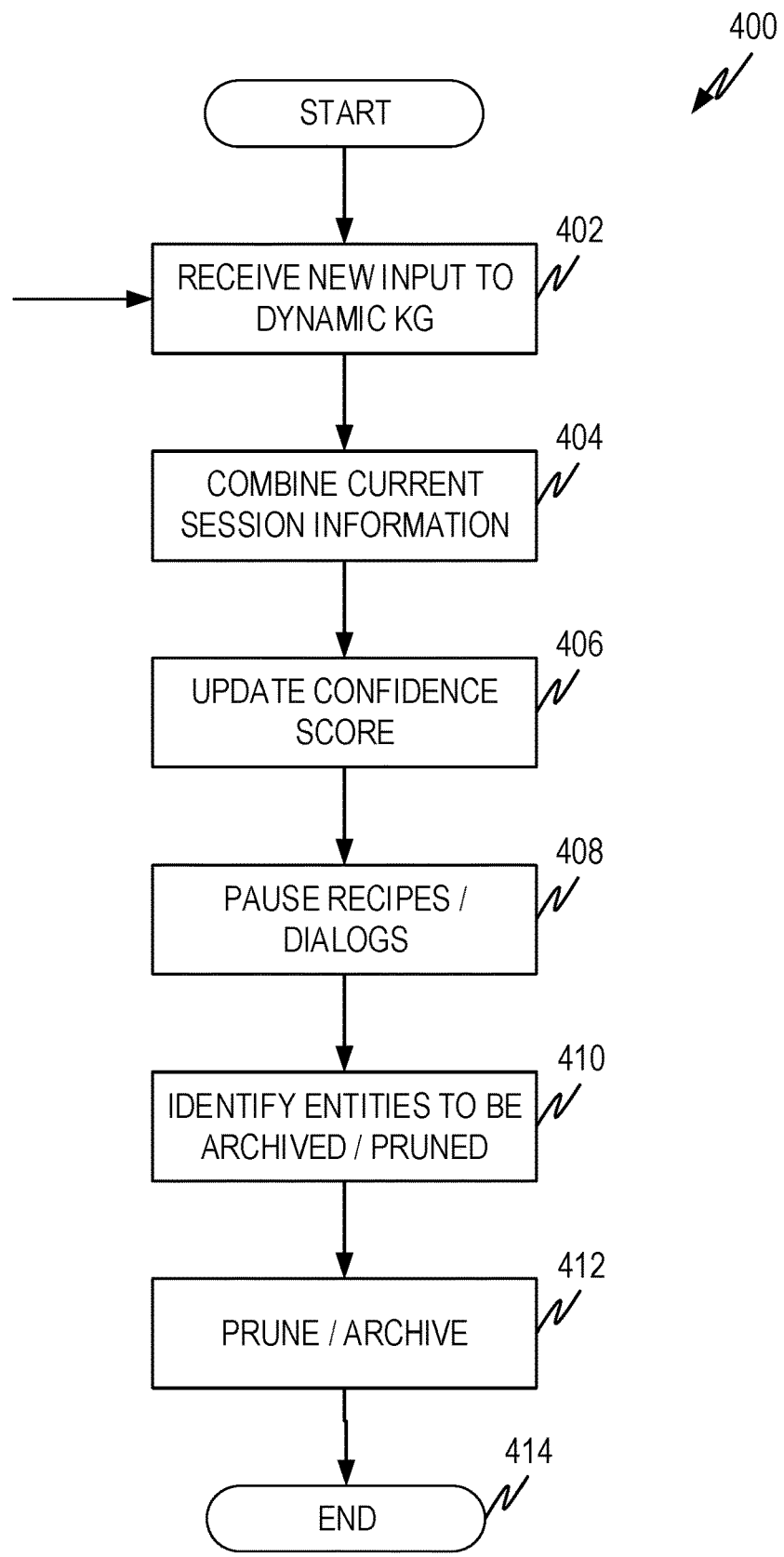
FIG. 4 illustrates a representative flow diagram for a state tracker according to some aspects of the present disclosure.

FIG. 4 illustrates a representative flow diagram 400 for a state tracker according to some aspects of the present disclosure. The state tracker receives new input to be placed into the dynamic knowledge graph in operation 402. As described previously, such input can be any number of any type of entities. For example, such input can be contextual information, semantic representation of some type of input (user input, input from an API call, and so forth), recipe(s), knowledge entities, structural relationships among entities, and other such information. The input can come from the input preprocessing engine or from another location.

In operation 404 the state tracker combines the input information into the current session information. As discussed above, the initial state of the dynamic knowledge graph can include a combination of the semantic input representation, the context, a search static knowledge graph recipe, and/or a search personal knowledge graph recipe.

New input is merged into the dynamic knowledge graph in several ways. If the dynamic knowledge graph has an entity that matches the input of a recipe to be added to the dynamic knowledge graph, the input of the recipe can be bound to the entity. If the entity to be added is a knowledge entity that matches the input of a recipe to be added to the dynamic knowledge graph, the knowledge entity can be bound to the input of the recipe and the recipe and bound knowledge entity can be added to the dynamic knowledge graph. If the entity to be added is a knowledge entity that matches the input of a recipe in the dynamic knowledge graph, the knowledge entity can be bound to the input of the recipe. If the entity does not relate to any other entity, it can be placed unbound into to the dynamic knowledge graph. Note that these are not necessarily mutually exclusive. For example, a knowledge entity can be bound both to a recipe in the dynamic knowledge graph and to a recipe that is being added to the dynamic knowledge graph.

The state tracker updates the confidence information in operation 406 in some embodiments. For example, language understanding models often have a metric associated with the outputs of the language understanding model that gives a measure of the likelihood or uncertainty associated with the output. As will be appreciated by those of skill in the art, likelihood and uncertainty are similar measures in that one can derive the certainty (or confidence) that the output represents what the user intended using either score. For example, Likelihood measures how likely it is that the output represents what the user intended. Similarly, uncertainty (or ambiguity) measures how much ambiguity exists that the output represents what the user intended. In this disclosure, confidence scores will be used to encompass any such scores that measure likelihood, uncertainty and so forth.

The confidence scores can be updated as part of operation 406 as the dynamic knowledge graph evolves and dialogs become more or less likely. Updating confidence scores can be based on the algorithm used to calculate them, such as used by the language understanding model to calculate the confidence scores. Additionally, or alternatively, the confidence scores can be based on relevance of an entity or dialog to the ultimate user intent (i.e., associated with the user input). Other mechanisms can also be used to update the confidence scores.

Operation 408 identifies any recipes and/or dialogs that should be paused. In some embodiments, this determination is made by the policy engine and not by the state tracker. As noted above, recipes and/or dialogs can be paused as they come into and out of scope and/or if they are otherwise not ready to be run. When a dialog or recipe does not have the information it needs to run, it can be paused. Similarly, when a dialog or recipe is waiting on completion of another dialog, API call, recipe, and so forth, a dialog or recipe can be paused.

Dialogs, knowledge entities, recipes, and so forth can also be archived and/or pruned as indicated in operation 410. Dialogs or recipes can be archived/pruned when they are either not relevant to the intent (e.g., they are out of scope) or are unlikely to execute to completion. A dialog or recipe can be archived, for example, in the user's personal knowledge graph so that they can be retrieved at a later time if they become relevant, if the user inputs a similar input, or for other reasons. By archiving a dialog or recipe along with entities that represent the state of the dialog or recipe, the dialog or recipe can be retrieved without restarting the conversation. In this sense, an archived dialog or recipe can be thought of as a paused dialog or recipe that has been persisted.

Operation 412 archives and/or prunes the entities that have been identified in operation 410. As noted above, archived entities can be stored in a user's personal knowledge graph or some other data store. Archiving may include some form of summarization where some details of the dialog are removed or are more compactly represented. Pruned entities refer to entities that are deleted rather than paused or archived.

The process ends at operation 414.

Figure 5:
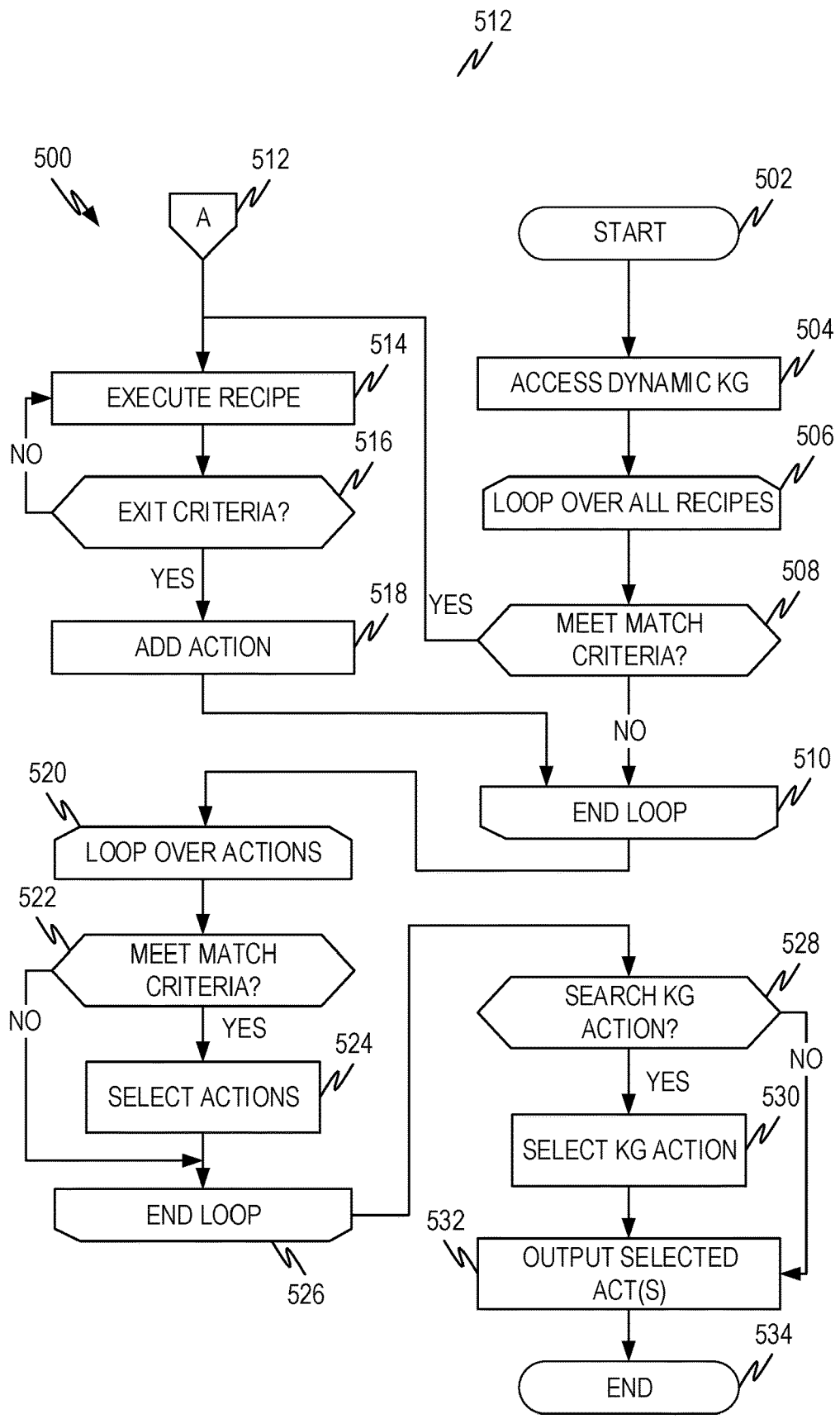
FIG. 5 illustrates a flow diagram for a policy engine according to some aspects of the present disclosure.

FIG. 5 illustrates a flow diagram 500 for a policy engine according to some aspects of the present disclosure. Since the conversation is stored in a dynamic knowledge graph, an inference across the dynamic knowledge graph can be run to identify what should be done next. The operations in FIG. 5 represent a possible implementation of that inference.

The flow diagram begins at operation 502 and proceeds to operation 504. In operation 504 the policy engine accesses the dynamic knowledge graph. Operations 506, 508 and 510 form a loop where each of the recipes in the dynamic knowledge graph are examined to see which should be executed. Multiple recipes can be selected for execution and thus all the recipes are examined to determine if the recipe matches the selection criteria (operation 508). Recipes can be selected based on several different criteria. For example, operation 508 can select any recipe that is able to execute in some embodiments. In yet another example, the recipes can be ranked according to a criterion or multiple criteria, such as confidence score, and any recipes having a threshold level of confidence score can be selected to execute. In still a further example, the top N recipes that best match the user input (e.g., have the highest confidence scores) are selected to execute. Combinations thereof can also be used.

When a recipe matches the selection criteria, the "yes" branch out of operation 508 is taken and the recipe is instantiated to run, if needed. Operation 514 executes the selected recipe until the procedure invokes an API call, it generates a response/call to the user or it calls for the execution of another recipe, or it finishes execution. These are collectively referred to as exit criteria in operation 516.

Figure 6:
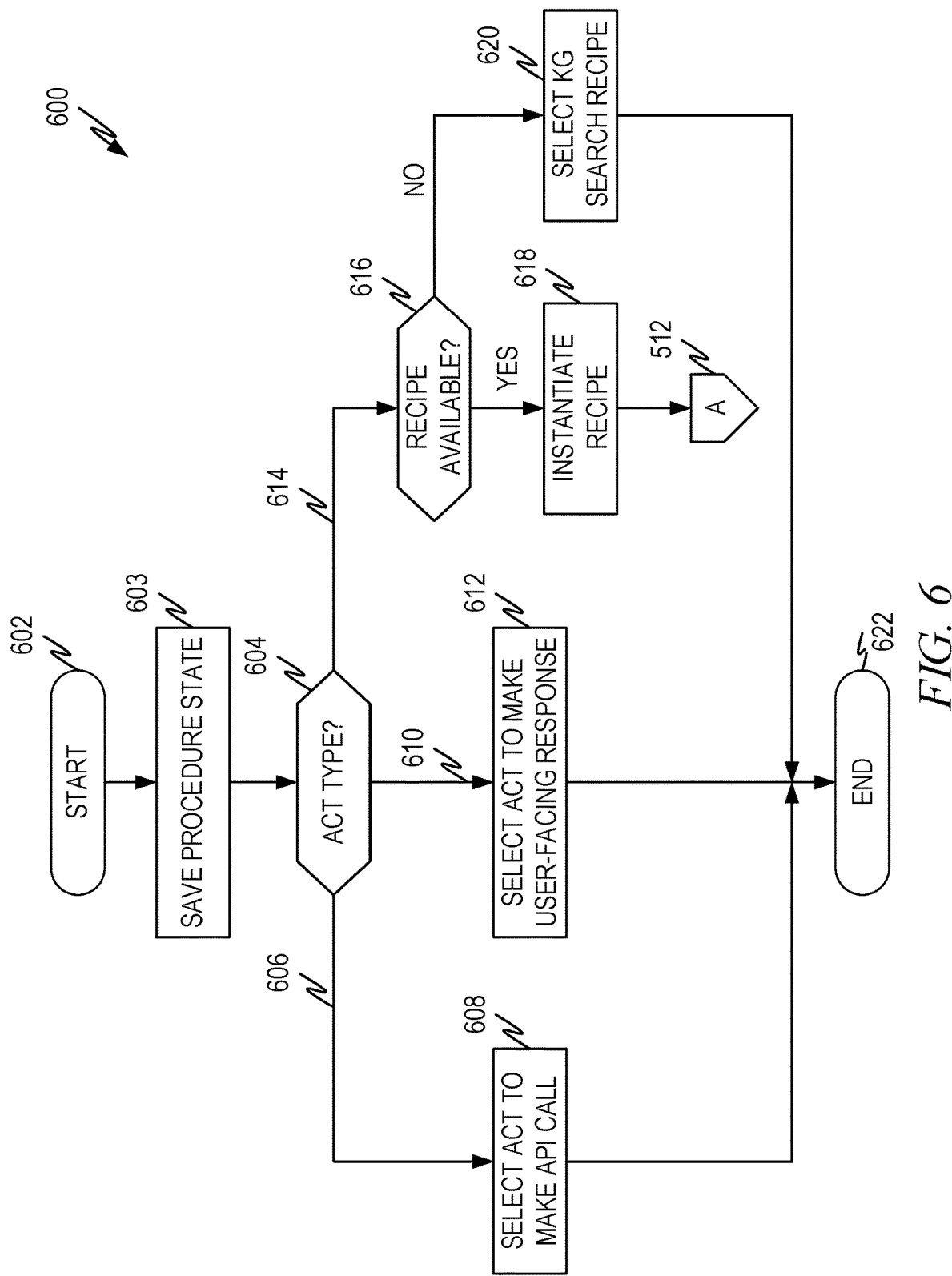
FIG. 6 illustrates a flow diagram for executing an act according to some aspects of the current disclosure.

Upon occurrence of one of the exit criteria, operation 516 proceeds along the "yes" branch to operation 518 where a selected act is added to a list from which the final group of acts will be selected. FIG. 6 is a representative example of how operation 518 may be implemented and will be discussed below.

Execution proceeds to operation 510, which selects the next recipe to examine, if any.

Once all the recipes have been examined and the corresponding procedures of selected recipes executed, a list of possible acts that can be emitted from the policy manager will have been created. Execution proceeds to operation 520 where all the acts on the list are examined to select one or more acts to emit from the policy manager.

In operation 522 the next act in the list is examined and tested to see if it matches the selection criteria. Acts can be selected based on several different criteria. For example, operation 522 can select any act on the list, so that all acts on the list are selected. In yet another example, the acts can be ranked according to a criterion or multiple criteria, such as confidence score, and any acts having a threshold level of confidence score can be selected to execute. In still a further example, the top N acts that best match the user input (e.g., have the highest confidence scores) are selected to execute. Combinations thereof can also be used.

If an act is selected, the "yes" branch is taken and the act is selected in operation 524.

The selection of acts by operations 522 and 524 can take into account the characteristics of the canvas when selecting acts that call user-facing renderers. As discussed before, which acts are selected and how many user-facing acts are selected to be rendered simultaneously can depend on the canvas that will receive the render. For example, if the system needs to retrieve a preference for the type of pizza the user wants to order and the size of the pizza the user wants to order, if the screen real estate is sufficiently large, and if the user can focus on the questions being asked, the system may elect to present a dialog asking for both pieces of information. On the other hand, if the user is in a vehicle interacting by voice, in order not to distract the user (i.e., add to the user's cognitive load), the system may elect to ask the questions one at a time. Thus, only a single question may be selected for the current processing round.

Operation 526 causes the loop to consider the next act, if any.

The recipe to search the static knowledge graph is always available for selection. Thus, one act that can be selected is to search the static knowledge graph when the search static knowledge graph recipe is selected for execution. This act can be selected in addition to any other acts selected. Operation 528 tests whether the system wants to select the search static knowledge graph act. The search static knowledge graph act can be selected in a variety of circumstances. For example, if there are no other acts that are selected, because the dynamic knowledge graph contains no other recipes, because no other acts were selected for output (i.e., no acts selected by loop 520, 522, 524, 526), or for some other reason, the search static knowledge graph act can be selected. Additionally, or alternatively, whether the search dynamic knowledge graph act is selected can be based on entities in the dynamic knowledge graph having unbound inputs. For example, if the number of unbound inputs reaches a threshold number, if the unbound inputs are likely to be found in the static knowledge graph, or for some other reason, the search dynamic knowledge graph act can be selected.

When the criteria/criterion for selecting the search static knowledge graph act is met, the "yes" branch is taken and the search static knowledge graph act is selected in operation 530. Otherwise, the "no" branch is taken and a list of selected acts is output from the policy engine. This list of selected acts will be executed, by calling the corresponding API, by generating a response to the user (e.g., a call to a renderer), and so forth.

The output form of the selected acts depends on the embodiment and on the act. Acts can comprise any number of items, such as presenting a dialog (visual, spoken, and so forth) to a user, requesting information from a user in a desired format such as visual, spoken, text and so forth, a call to an API to perform some functionality such as setting a timer, a call to a device, a call to set a polling event to generate call back and so forth. One option for the policy engine is to return no action (i.e., a null list). In this instance, the system waits or begins a new round of processing.

FIG. 6 illustrates a flow diagram 600 for add an act (i.e., operation 518) according to some aspects of the current disclosure. As discussed above, operation 518 is reached if the procedure associated with the selected hits an exit criteria such as when the recipe invokes an API call, generates a response/call to the user, calls for the execution of another recipe, or it finishes execution. The first three options are addressed in FIG. 6. If execution of the procedure finishes, execution runs from operation 516 to operation 510 and FIG. 6 is not implicated.

Execution begins at operation 602 and proceeds to operation 603 where the state of the procedure is saved in the dynamic knowledge graph. This is so that the execution of the procedure can be resumed once the API call, the response/call to the user and/or the execution of another recipe is complete.

Execution then proceeds to operation 604 where the system identifies which of the exit criteria happened (invoking an API call, generating a response/call to the user, calling for the execution of another recipe).

If the exit criterion is invoking an API call, branch 606 is taken out of operation 604 and an act to make the API call is selected (operation 608). This means that an act to call the appropriate API is added to the list that will be evaluated in the loop comprising operations 520, 522, 524 and 526. Execution then ends at operation 622 and on FIG. 5 execution proceeds to operation 510.

If the exit criterion is generating a response/call to the user, branch 610 is taken out of operation 604 and an act to make the appropriate user facing response is selected (operation 612). This means that an act to make the appropriate user facing response is added to the list that will be evaluated in the loop comprising operations 520, 522, 524 and 526. Execution then ends at operation 622 and on FIG. 5 execution proceeds to operation 510.

If the exit criterion is to execute another recipe, branch 614 is taken out of operation 604 to operation 616 where the dynamic knowledge graph is examined to determine whether the other recipe is available. If so, the "yes" branch is taken and execution proceeds to operation 618 where the recipe is instated for execution if needed. Execution then proceeds through connector 512 to operation 514 where the recipe is executed. The connection 512 bypasses operation 506 which tests the called recipe is selected for execution under the assumption that the called recipe has already been selected for execution based on the selection of the calling recipe. As an alternative implementation, the connection 512 could connect prior to operation 508 at which time the called recipe can be selected (or not) for execution. If the called recipe runs to completion, the prior recipe execution can be resumed in some embodiments (not illustrated on FIG. 5 or 6).

If the recipe is not available, the "no" branch is taken to operation 620 where the act to search the static knowledge graph for the recipe is selected. This means that an act to search the static knowledge graph for the recipe is added to the list that will be evaluated in the loop comprising operations 520, 522, 524 and 526. Execution then ends at operation 622 and on FIG. 5 execution proceeds to operation 510.

Figure 7:
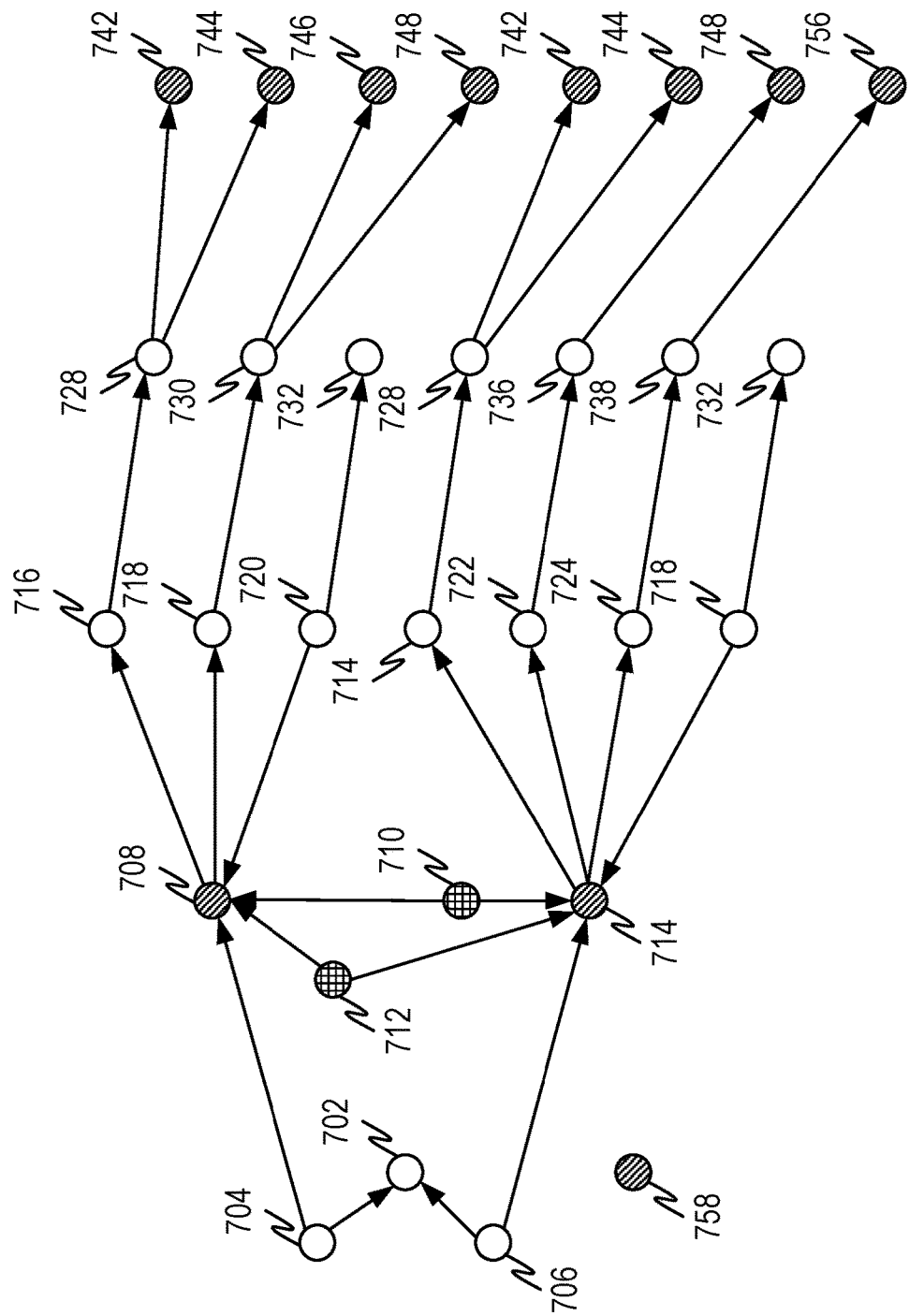
FIG. 7 illustrates a representative dynamic knowledge graph that has been built up over a series of processing rounds from an "order pizza" request by the user.

The example of FIG. 7 serves to illustrate how FIGS. 5 and 6 work. FIG. 7 illustrates a representative dynamic knowledge graph that has been built up over a series of processing rounds from an "order pizza" request by the user. The dynamic knowledge graph has been simplified somewhat to remove context and other information for clarity.

The open circles represent general entities (knowledge entities, etc.) while the filled circles represent recipes. The following table shows names for the various numbered entities on the diagram. The names are not included on the diagram to enhance readability since not all the names and numbers would fit on the diagram.

TABLE 1

Description labels for FIG. 7

| Number | Description |
| --- | --- |
| 702 | Pizza |
| 704 | Word's Best Pizza |

TABLE 1-continued

Description labels for FIG. 7

| Number | Description |
| --- | --- |
| 706 | Best Pizza in the World |
| 708 | WBP_Order |
| 710 | Place_Order |
| 712 | Food_Type: Pizza |
| 714 | BPW_Order |
| 716 | Order |
| 718 | Account |
| 720 | OrderID |
| 722 | Name |
| 724 | PhoneNumber |
| 728 | OrderType |
| 730 | AccountType |
| 732 | OrderIDType |
| 736 | NameType |
| 738 | PhoneNumberType |
| 742 | AskForPizza |
| 744 | WhichPizza |
| 746 | PKGLookup |
| 748 | AskForName |
| 756 | AskForPhoneNumber |
| 758 | Search_KG |

In the knowledge graph of FIG. 7, the Place_Order 710 and Food_Type: Pizza 712 represent the semantic representation of the user input. As noted in FIG. 7, these two inputs have been bound to both the World's Best Pizza order recipe 708 and the Best Pizza in the World order recipe 714. The recipe selection loop of FIG. 5 (operations 506, 508 and 510) select both recipe 708 and recipe 714 for execution since the system has no way to know at this stage which of the two places the user may want to order from.

Note that both the Word's Best Pizza recipe 708 and the Best Pizza in the World recipe 714 utilize common recipes to accomplish their work. For example both recipes use AskForPizza recipe 742, WhichPizza recipe 744, and AskForName recipe 748.

When recipe 708 is selected by operation 508 to execute, the recipe is executed (operation 514) until the recipe calls for the further execution of the AskForPizza recipe 742, WhichPizza recipe 744, PKGLookup recipe 746 and AskForName recipe 748. Recipes 742 and 746 asks the user for details (the details of the pizza the user wants and the name on the order, respectively). Recipe 746 looks up user details (such as payment information and so forth) from the user's personal knowledge graph. Recipe 744 sends information to the user about which pizzas are available for order if the user wants such information.

Assuming that the further recipes associated with recipe 708 selected to execute are recipes 742, 746 and 748, FIG. 6, will switch execution to these recipes (operation 616) and the execution results in the acts that correspond to these recipes will end up on the list of actions to be evaluated in operations 520, 522, 524 and 526. These acts will be user-facing calls to ask the user the details of which pizza they want (i.e., AskForPizza recipe 742), an act to look up user information from the user's personal knowledge graph (i.e., PKGLookup recipe 746) and an act to ask the user for their name (i.e., AskForName recipe 748).

When recipe 714 is selected by operation 508 to execute, the recipe is executed (operation 514) until the recipe calls for the further execution of the AskForPizza recipe 742, WhichPizza recipe 744, AskForName recipe 748 and AskForPhoneNumber recipe 756. Recipes 742, 746 and 756 asks the user for details (the details of the pizza the user wants, the name on the order, and the user's phone number respectively). Recipe 744 sends information to the user about which pizzas are available for order if the user wants such information.

Assuming that the further recipes associated with recipe 714 selected to execute are recipes 742, 748 and 756, FIG. 6, will switch execution to these recipes (operation 616) and the execution results in the acts that correspond to these recipes will end up on the list of actions to be evaluated in operations 520, 522, 524 and 526. These acts will be user-facing calls to ask the user the details of which pizza they want (i.e., AskForPizza recipe 742), an act to ask the user for their name (i.e., AskForName recipe 748), and an act to ask the user for their phone number (i.e., AskForPhoneNumber recipe 756).

Thus, the list of actions to sort over comprises the following, with the first group coming from the World's Best Pizza recipe 708 and the second group coming from the Best Pizza in the World recipe 714:

Render:
    AskForPizza
    PDKLookup
    AskForName
Render:
    AskForPizza
    AskForName
    AskForPhoneNumber These all have been selected without regard to the canvas. In this situation, there are common acts that can be selected (AskForPizza and AskForName). Thus, how many acts and which acts are selected can be based on the canvas, the commonality between acts and other factors, such as which acts make sense from a conversational standpoint to ask first. For example, acts that should be asked first in a conversation can be ranked highest, with acts that are common ranked second and finally other acts ranked last. As another example, acts that don't require user interaction may be ranked higher than those that do, or vice versa. Other ranking criteria can also be used. Thus, operations 520, 522, 524 and 526 loop over all the acts in this list and apply the criteria to select one or more acts. In this case, if the canvas allows only for a single request at a time, the system can select the AskForName or AskForPizza act. If the system has no reason to select one over the other (i.e., no rank, score or other criteria that would allow the system to choose one over the other), then the system can use a defined strategy such as picking the first act in the list, randomly picking an act, and so forth. The selected act is then output in operation 532 assuming that the search static knowledge graph act is not also selected. Flow diagram 500 ends at operation 534.

In all the embodiments above, machine learning can be added to accomplish or help accomplish the functionality described. One or more reinforcement learning, supervised, or unsupervised machine learning processes, such as a support vector machine (SVM) technique, a convolutional neural network, a deep neural network, decision tree process, k nearest neighbor process, kernel density estimation, K-means clustering, expectation maximization, and so forth can be used in the system. For example, machine learning can be used to help identify entities that are likely or unlikely to run to completion and thus are candidates for pausing, archiving and/or pruning. As another example, machine learning can help identify items that should be pulled into the dynamic knowledge graph to help accomplish a user's intent. For example, over time the system can learn that when a user has a particular intent, that a particular set of entities is used to accomplish that intent. Thus, the entities can be retrieved and placed into the dynamic knowledge graph to help accomplish the intent. Additionally, or alternatively, machine learning can learn to capture entities that are missing from the semantic space. Thus, they can help the dynamic knowledge graph, static knowledge graph and/or personal knowledge graph to evolve to include new features.

In yet another example, machine learning can be used to help identify recipes that can be linked together to accomplish things not "hard coded" into the recipes themselves. As discussed above, one recipe can call another. However, often two unrelated recipes can accomplish more when they are executed together even if they are not linked together. For example, if a user asks the system to book a flight, and the system learns over time that when leaving on a flight the user often orders transportation to the airport, the system can learn to "link" the recipe that books a flight and the recipe that orders transportation to proactively anticipate the user's future request.

The machine learning processes each have training processes (supervised or unsupervised). Initial training can be accomplished either by starting with a "standard" model that adapts over time to be personalized or by using a batch of collected data for initial training.

Example Machine Architecture and Machine-Readable Medium

Figure 8:
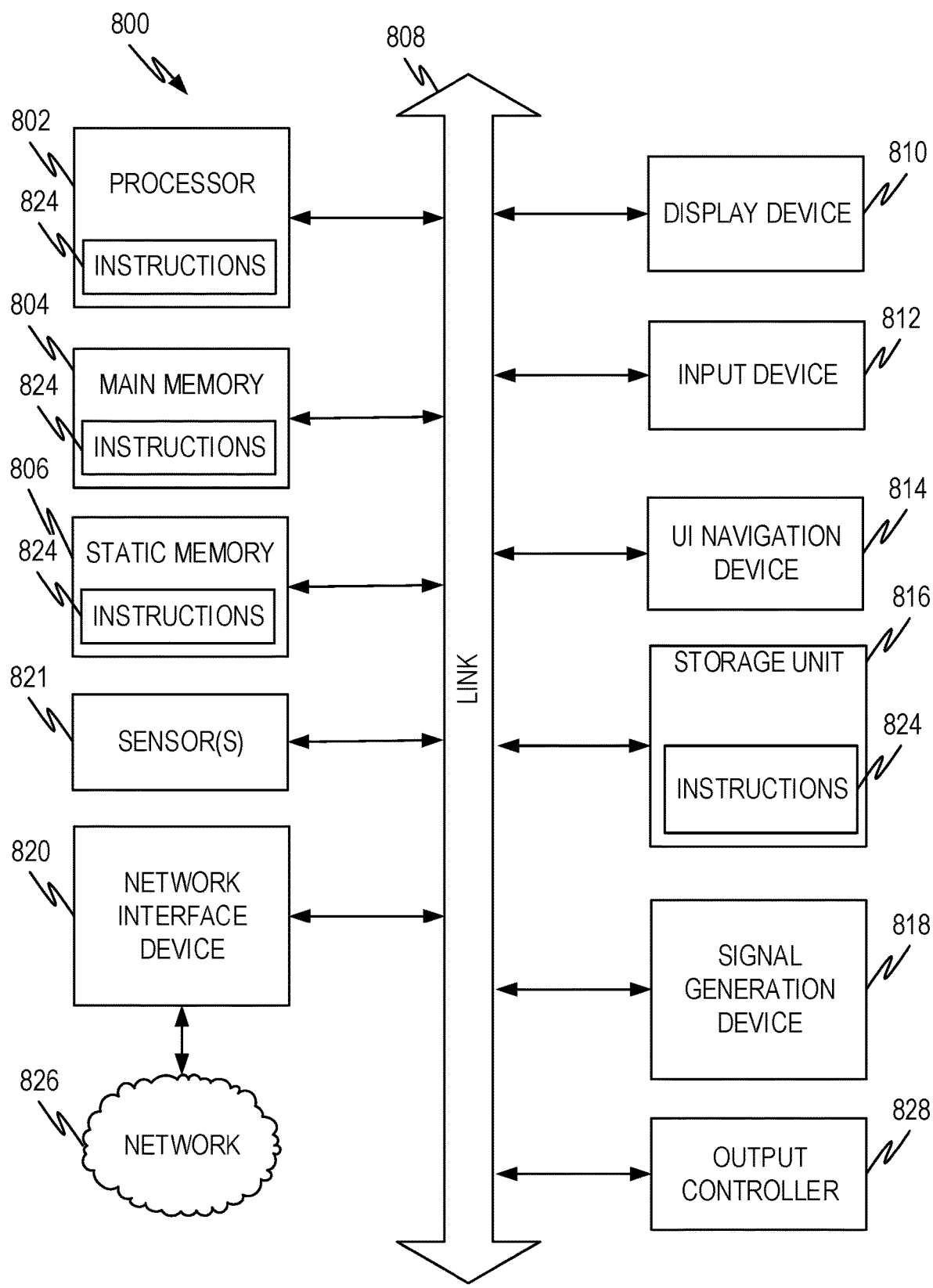
FIG. 8 illustrates a representative machine architecture suitable for implementing the systems and other aspects disclosed herein or for executing the methods disclosed herein.

FIG. 8 illustrates a representative machine architecture suitable for implementing the systems and so forth or for executing the methods disclosed herein. The machine of FIG. 8 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 8 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 800 includes at least one processor 802 (e.g., a central processing unit (CPU), a graphics processing unit (GPU), advanced processing unit (APU), or combinations thereof), one or more memories such as a main memory 804, a static memory 806, or other types of memory, which communicate with each other via link 808. Link 808 may be a bus or other type of connection channel. The machine 800 may include further optional aspects such as a graphics display unit 810 comprising any type of display. The machine 800 may also include other optional aspects such as an alphanumeric input device 812 (e.g., a keyboard, touch screen, and so forth), a user interface (UI) navigation device 814 (e.g., a mouse, trackball, touch device, and so forth), a storage unit 816 (e.g., disk drive or other storage device(s)), a signal generation device 818 (e.g., a speaker), sensor(s) 821 (e.g., global positioning sensor, accelerometer(s), microphone(s), camera(s), and so forth), output controller 828 (e.g., wired or wireless connection to connect and/or communicate with one or more other devices such as a universal serial bus (USB), near field communication (NFC), infrared (IR), serial/parallel bus, etc.), and a network interface device 820 (e.g., wired and/or wireless) to connect to and/or communicate over one or more networks 826.

Executable Instructions and Machine-Storage Medium

The various memories (i.e., 804, 806, and/or memory of the processor(s) 802) and/or storage unit 816 may store one or more sets of instructions and data structures (e.g., software) 824 embodying or utilized by any one or more of the methodologies or functions described herein. These instructions, when executed by processor(s) 802 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A method for accomplishing an action requested by a user, comprising:
 receiving a semantic representation of an input, the semantic representation comprising an intent and a slot;
 adding the semantic representation of the input into a dynamic knowledge graph comprising a knowledge graph search recipe;
 selecting a knowledge graph search action associated with the knowledge graph search recipe;
 executing the knowledge graph search action against a knowledge graph comprising stored recipes and semantic representations of real world information;
 receiving, in response to the action, any entities matching the associated action;
 merging a subset of the entities into the dynamic knowledge graph to yield an updated dynamic knowledge graph; and
 executing a second action associated with the intent.

Example 2

The method of example 1 further comprising:
 responsive to the merging operation:
 selecting an action associated with a recipe in the updated dynamic knowledge graph; and
 executing the action.

Example 3

The method of example 2 wherein executing the action comprises:
 identifying an action type associated with the action;
 based at least in part on the action type, perform at least one operation comprising:
 emit an action to make an API call;
 emit an action to make a user-facing response;
 execute an action of a selected recipe; and
 emit an action to perform a knowledge graph search.

Example 4

The method of example 1 wherein the subset of the entities comprises a recipe.

Example 5

The method of example 1 further comprising:
 pausing execution of a recipe in the dynamic knowledge graph; and
 maintaining a state of the paused recipe.

Example 6

The method of example 5 further comprising resuming execution of the paused recipe.

Example 7

The method of example 1 further comprising:
 identifying a dialog that has gone out of scope; and
 archiving the dialog that has gone out of scope to a personal knowledge graph associated with a user.

Example 8

The method of example 1 further comprising chaining a plurality of recipes together to arrive at the second action.

Example 9

The method of example 1, 2, 3, 4, 5, 6, 7 or 8 wherein the entities comprise at least one of:

a recipe;
a knowledge entity; and
a structured relationship.

Example 10

A system comprising a processor and computer executable instructions, that when executed by the processor, cause the system to perform operations comprising:
access a dynamic knowledge graph having an initial state and storing a current state of a conversation with a user, the dynamic knowledge graph in its initial state comprising:
a semantic representation of an input from the user, the semantic representation comprising an intent and a slot;
a search knowledge graph recipe; and
a personal knowledge graph recipe;
select a recipe in the dynamic knowledge graph;
select at least one action associated with the recipe;
execute the at least one action;
update the dynamic knowledge graph based at least in part on an outcome of the execution of the at least one action; and
execute a second action associated with the intent.

Example 11

The system of example 10 wherein update the dynamic knowledge graph comprises:
identify at least one entity returned as part of the execution of the at least one action; and
merge the at least one entity into the dynamic knowledge graph.

Example 12

The system of example 10 wherein multiple rounds of the operations:
selection of the recipe in the dynamic knowledge graph;
selection of at least one action;
execution of the at least one action; and
updating the dynamic knowledge graph,
are performed prior to execution of the second action.

Example 13

The system of example 10, 11, or 12 wherein executing the at least one action comprises:
identifying an action type associated with the at least one action;
based at least in part on the action type, perform at least one operation comprising:
emit an action to make an API call;
emit an action to make a user-facing response;
execute an action of a selected recipe; and
emit an action to perform a knowledge graph search.

Example 14

The system of example 10, 11, or 12 further comprising:
identify a dialog that has gone out of scope; and
archive the dialog that has gone out of scope to a personal knowledge graph associated with a user.

Example 15

The system of example 10, 11, or 12 wherein:
the selected recipe in the dynamic knowledge graph comprises the search knowledge graph recipe;
the selected at least one action comprises a search of a knowledge graph comprising stored recipes and real world information;
execution of the search returns at least one entity subsequently merged into the dynamic knowledge graph by the update operation; and
wherein the at least one entity comprises at least one of:
a recipe;
a knowledge entity; and
a structured relationship.

Example 16

A method for accomplishing an action requested by a user, comprising:
receiving a semantic representation of an input, the semantic representation comprising an intent and a slot (208, 402);
adding the semantic representation of the input into a dynamic knowledge graph comprising a knowledge graph search recipe (404);
selecting a knowledge graph search action associated with the knowledge graph search recipe (530);
executing the knowledge graph search action against a knowledge graph comprising stored recipes and semantic representations of real world information (220);
receiving, in response to the action, any entities matching the associated action (224, 225, 402);
merging a subset of the entities into the dynamic knowledge graph to yield an updated dynamic knowledge graph (210, 404); and
executing a second action associated with the intent.

Example 17

The method of example 16 further comprising:
responsive to the merging operation:
selecting an action associated with a recipe in the updated dynamic knowledge graph; and
executing the action.

Example 18

The method of example 17 wherein executing the action comprises:
identifying an action type associated with the action;
based at least in part on the action type, perform at least one operation comprising:
emit an action to make an API call;
emit an action to make a user-facing response;
execute an action of a selected recipe; and
emit an action to perform a knowledge graph search.

Example 19

The method of example 16, 17, or 18 wherein the subset of the entities comprises a recipe.

Example 20

The method of example 16, 17, 18, or 19 further comprising:
pausing execution of a recipe in the dynamic knowledge graph; and
maintaining a state of the paused recipe.

Example 21

The method of example 20 further comprising resuming execution of the paused recipe.

Example 22

The method of example 16, 17, 18, 19, 20, or 21 further comprising:
identifying a dialog that has gone out of scope; and
archiving the dialog that has gone out of scope to a personal knowledge graph associated with a user.

Example 23

The method of example 16, 17, 18, 19, 20, 21, or 22 further comprising chaining a plurality of recipes together to arrive at the second action.

Example 24

The method of example 16, 17, 18, 19, 20, 21, 22, or 23 wherein the entities comprise at least one of:
a recipe;
a knowledge entity; and
a structured relationship.

Example 25

The method of example 16, 17, 18, 19, 20, 21, 22, 23, or 24 wherein multiple rounds of the operations:
selecting the knowledge graph search action;
executing the knowledge graph search action;
receiving, in response to the action, any entities matching the associated action; and
merging the subset of the entities into the dynamic knowledge graph,
are performed prior to execution of the second action associated with the intent.

Example 26

The method of example 16, 17, 18, 19, 20, 21, 22, 23, 24, or 25 further comprising:
selecting a recipe in the dynamic knowledge graph;
selecting at least one action associated with the recipe;
executing the at least one action;
updating the dynamic knowledge graph based at least in part on an outcome of the execution of the at least one action;

Example 27

The method of example 26 wherein executing the at least one action comprises:
identifying an action type associated with the at least one action;
based at least in part on the action type, perform at least one operation comprising:
emit an action to make an API call;
emit an action to make a user-facing response;
execute an action of a selected recipe; and
emit an action to perform a knowledge graph search.

Example 28

The method of example 16, 17, 18, 19, 20, 21, 22, 23, 24, 25, 26, or 27 further comprising:
identify a dialog that has gone out of scope; and
archive the dialog that has gone out of scope to a personal knowledge graph associated with a user.

Example 29

An apparatus comprising means to perform a method as in any preceding example.

Example 30

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for accomplishing a task requested by a user, comprising:
receiving a semantic representation of an input, the semantic representation comprising an intent and a slot;
in response to receiving the semantic representation, adding the semantic representation of the input into a dynamic knowledge graph, wherein the dynamic knowledge graph comprises a search knowledge graph entity which defines a first set of operations for searching a static knowledge graph, and wherein the static knowledge graph comprises a second set of operations and semantic representations of real world information;
running a knowledge graph inference on the dynamic knowledge graph to select the search knowledge graph entity;
in response to selecting the search knowledge graph entity, executing the first set of operations against the static knowledge graph;
in response to executing the first set of operations, receiving the second set of operations and one or more entities associated with the semantic representation;
merging the second set of operations and the one or more entities into the dynamic knowledge graph to yield an updated dynamic knowledge graph;
executing the second set of operations in the updated dynamic knowledge graph, wherein the second set of operations are operable to effectuate the intent using at least a subset of the one or more entities; and
in response to executing the second set of operations, providing a response to the user.

2. The method of claim 1, further comprising:
responsive to the merging the second set of operations and the one or more entities into the dynamic knowledge graph:
selecting the second set of operations in the updated dynamic knowledge graph.

3. The method of claim 2, wherein executing the second set of operations comprises:
identifying an action type associated with the second set of operations;

based at least in part on the action type, perform at least one operation comprising:
make an API call,
make a user-facing response,
execute an action of the second set of operations, or
perform a knowledge graph search.

4. The method of claim 1, wherein the subset of the one or more entities comprises one or more sets of operations.

5. The method of claim 1, further comprising:
pausing execution of a set of operations in the dynamic knowledge graph; and
maintaining a state of the paused set of operations.

6. The method of claim 5, further comprising resuming execution of the paused set of operations.

7. The method of claim 1, further comprising:
identifying a dialog that is out of scope; and
archiving the dialog that is out of scope to a personal knowledge graph associated with the user.

8. The method of claim 1, further comprising chaining a plurality of operations together to arrive at the second set of operations.

9. The method of claim 1, wherein the one or more entities comprise at least one of:
a set of operations;
a knowledge entity; or
a structured relationship.

10. The method of claim 1, wherein the first set of operations lists at least one of:
one or more input entity types accepted by the first set of operations; or
one or more output entity types produced by the first set of operations.

11. The method of claim 1, wherein the first set of operations define a relationship between at least two of the one or more entities.

12. The method of claim 1, further comprising:
further in response to receiving the semantic representation, adding contextual information specific to the user into the dynamic knowledge graph, the contextual information comprising at least one of:
signals from a user device of the user,
inferred signal data for the user, or
signals from a personal knowledge graph or personal profile of the user; and
wherein the second set of operations is selected based on the contextual information.

13. The method of claim 1, wherein the second set of operations define one or more inputs matching the semantic representation.

14. A system comprising a hardware processor and computer executable instructions, that when executed by the hardware processor, cause the system to perform operations for accomplishing a task requested by a user, the operations comprising:
receive a semantic representation of an input, the semantic representation comprising an intent and a slot;
in response to receiving the semantic representation, add the semantic representation of the input into a dynamic knowledge graph, wherein the dynamic knowledge graph comprises a search knowledge graph entity which defines a first set of operations for searching a static knowledge graph, and wherein the static knowledge graph comprises a second set of operations and semantic representations of real world information;
run a knowledge graph inference on the dynamic knowledge graph to select the search knowledge graph entity;
in response to selecting the search knowledge graph entity, execute the first set of operations against the static knowledge graph;
in response to executing the first set of operations, receive the second set of operations and one or more entities associated with the semantic representation;
merge the second set of operations and the one or more entities into the dynamic knowledge graph to yield an updated dynamic knowledge graph;
execute the second set of operations in the updated dynamic knowledge graph, wherein the second set of operations are operable to effectuate the intent using at least a subset of the one or more entities; and
in response to executing the second set of operations, provide a response to the user.

15. The system of claim 14, the operations further comprising:
responsive to the merging the second set of operations and the one or more entities into the dynamic knowledge graph:
select the second set of operations in the updated dynamic knowledge graph.

16. The system of claim 15, wherein executing the second set of operations comprises:
identify an action type associated with the second set of operations; and
based at least in part on the action type, perform at least one operation comprising:
make an API call,
make a user-facing response,
execute an action of the second set of operations, or
perform a knowledge graph search.

17. The system of claim 14, wherein the subset of the one or more entities comprises one or more sets of operations.

18. At least one computer-storage medium comprising executable instructions that, when executed by a processor of a machine, cause the machine to perform operations for accomplishing a task requested by a user, the operations comprising:
receive a semantic representation of an input, the semantic representation comprising an intent and a slot;
in response to receiving the semantic representation, add the semantic representation of the input into a dynamic knowledge graph, wherein the dynamic knowledge graph comprises a search knowledge graph entity which defines a first set of operations for searching a static knowledge graph, and wherein the static knowledge graph comprises a second set of operations and semantic representations of real world information;
run a knowledge graph inference on the dynamic knowledge graph to select the search knowledge graph entity;
in response to selecting the search knowledge graph entity, execute the first set of operations against the static knowledge graph;
in response to executing the first set of operations, receive the second set of operations and one or more entities associated with the semantic representation;
merge the second set of operations and the one or more entities into the dynamic knowledge graph to yield an updated dynamic knowledge graph;
execute the second set of operations in the updated dynamic knowledge graph, wherein the second set of operations are operable to effectuate the intent using at least a subset of the one or more entities; and
in response to executing the second set of operations, provide a response to the user.

19. The at least one computer-storage medium of claim 18, the operations further comprising:
   responsive to the merging the second set of operations and the one or more entities into the dynamic knowledge graph:
   select the second set of operations in the updated dynamic knowledge graph.

20. The at least one computer-storage medium of claim 19, wherein executing the second set of operations comprises:
   identify an action type associated with the second set of operations;
   based at least in part on the action type, perform at least one operation comprising:
   make an API call,
   make a user-facing response,
   execute an action of the second set of operations, or
   perform a knowledge graph search.

\* \* \* \* \*